United States Patent Office 3,645,965
Patented Feb. 29, 1972

3,645,965
STABILIZATION OF SYNTHETIC POLYMERS WITH IMIDAZOLIDINE COMPOUNDS
Keisuke Murayama, Syoji Morimura, Toshimasa Toda, Saburo Akagi, Tomoyuki Kurumada, and Ichiro Watanabe, Tokyo, Japan, assignors to Sankyo Company Limited, Tokyo, Japan
No Drawing. Filed Oct. 17, 1968, Ser. No. 768,974
Claims priority, application Japan, Oct. 23, 1967, 42/68,204; May 18, 1968, 43/33,429
Int. Cl. C08f 45/60; C08g 51/60
U.S. Cl. 260—45.8 N                4 Claims

ABSTRACT OF THE DISCLOSURE

Synthetic polymers such as homopolymers of olefins, copolymers of olefines with other ethylenically unsaturated monomers, polyurethanes, polyamides, polyacetals, polyesters, polymerized vinyl monomers and the like are stabilized against photo- and thermal-deteriorations thereof by having incorporated therein an effective amount of one of the 2,5-tri- or tetrasubstituted-4-oxo (or thioxo)-imidazolidines. Among these imidazolidines, some of the 2,5-tri- or tetrasubstituted-4-oxo-imidazolidines are novel substances and other imidazolidines as such are disclosed in the prior art. These novel and old 2,5-tri- or tetrasubstituted-4-oxo-imidazolidines are prepared by a novel process which comprises (1) reacting the corresponding α-aminonitrile with an appropriate ketone or aldehyde in the presence of a basic catalyst or (2) reacting the corresponding α-aminonitrile with an appropriate ketone or aldehyde and then subjecting the intermediate Schiff base to the action of a basic catalyst.

This invention relates to the stabilization of synthetic polymers with a certain class of imidazolidine compounds, the preparation of some of the above imidazolidine compounds and some novel imidazolidine compounds.

More particularly, in one aspect of this invention, it is concerned with the stabilization of synthetic polymers against the photo- and thermal-deteriorations thereof by having incorporated therein a sufficient amount to prevent such deterioration of the 2,5-tri- or tetra-substituted-4-oxo- (or thioxo)-imidazolidine compound having the formula

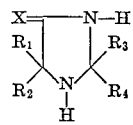

(I)

wherein $R_1$ and $R_2$ may be the same or different and each represents hydrogen atom,
an alkyl group of 1 to 18 carbon atoms,
a cycloalkyl group of 5 to 7 carbon atoms,
an aryl group of 6 or 10 ring carbon atoms which may be substituted with a halogen atom, an alkyl group of 1 to 4 carbon atoms, or an alkoxy group of 1 to 8 carbon atoms or
a 5- or 6-membered heterocyclic group which contains as a hetero atom at least one nitrogen or oxygen atom and may be substituted with nitro,
an alkyl group of 1 to 4 carbon atoms or an alkoxy group of 1 to 4 carbon atoms; or
they may be linked together with the carbon atom to which thye are attached to form a 5 to 7 membered alicyclic ring which may be substituted with an alkyl group of 1 to 4 carbon atoms, a cycloalkyl group of 5 to 7 carbon atoms or a cycloalkyidene group of 5 to 7 carbon, or the group of the formula

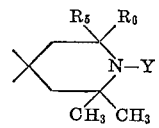

(wherein $R_5$ and $R_6$ may be the same or different and each represents an alkyl group of 1 to 6 carbon atoms and Y is hydrogen or oxygen radical); and
$R_3$ and $R_4$ may be the same or different and are the same as defined above with regard to the $R_1$ and $R_2$; provided that three or more of the $R_1$, $R_2$, $R_3$ and $R_4$ mean the above-defined groups other than hydrogen atom; and X is oxygen atom.

In the above Formula I, each of the groups $R_1$, $R_2$, $R_3$ and $R_4$ may be illustratively represented by the following; methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, cyclopentyl, cyclohexyl, cycloheptyl, phenyl, naphthyl, o-, m- or p-chloro (bromo or iodo) phenyl, o- m- or p-methyl (ethyl, propyl or butyl) phenyl, o-, m- or p-methoxy (ethoxy, propoxy, butoxy or octoxy) phenyl, pyridyl, furyl, pyranyl, 3,4-dihydro-2-pyranyl, 2-nitro-5-furyl, 2H - 2,6-dimethyl-5,6-dihydro-3-pyranyl.

The groups formed by linkage of the $R_1$ and $R_2$ or the $R_3$ and $R_4$ together with the carbon atoms to which they are attached may be illustratively represented by the following;

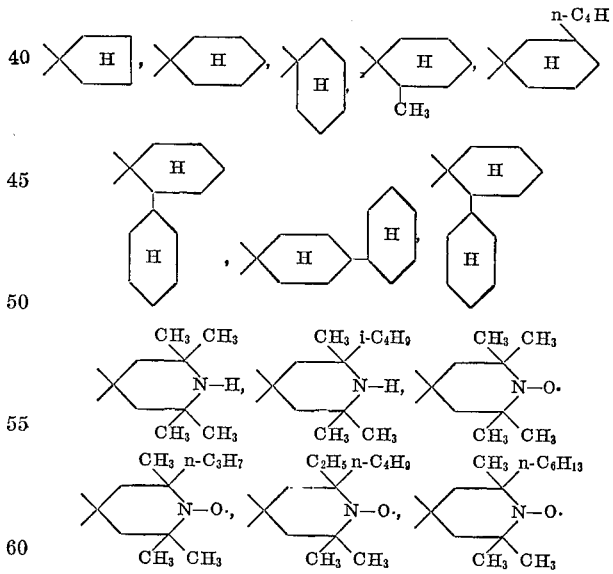

The "synthetic polymers" herein described are intended to include homopolymers of olefins such as high and low pressure polyethylenes, polypropylene, polybutadiene, polyisoprene, polystyrene and the like; copolymers of olefins with other ethylenically unsaturated monomers such as ethylene-propylene copolymers, styrene-butadiene copolymers, acrylonitrile-butadiene-styrene copolymers and the like; polyurethanes; polyamides such as 6 nylon, 6-6 nylon and the like; polyacetals; polyesters such as polyethylene terephthalate and the like; and polymerized vinyl monomers such as polyvinyl chloride, polyvinyl acetate, polyvinylidene chloride, polyvinyl ethers, polyvinyl ketones and the like. These synthetic polymers may be of any shape or form, for example, including filament, fiber, yarn, film, sheet, other shaped article, latex, foam and the like.

These synthetic polymers frequently tend to undergo photo- and thermal-deterioration when exposed outdoors or indoors to light such as sunlight or ultraviolet light. There have been heretofore proposed various types of stabilizers for the protection of these synthetic polymers against such deterioration. For instance, a great number of light stabilizers have been suggested in the art for the purpose of stabilizing the synthetic polymers, for example, polyolefins and polyurethanes against such photo-deterioration. Especially, there are favourably recommended as light stabilizers such chemicals as 2-(2'-hydroxy-5'-methylphenyl)-benzotriazole; 2-hydroxy-4-n-octoxybenzophenone, 1,1 - bis(2-methyl-4-hydroxy-5-tert.-butylphenyl)n-butane and the like. Although a number of prior art light and heat stabilizers are widely employed in the art, various attempts are being made in the art in order to develop the synthetic polymers to be stabilized.

As a result of our extensive investigations on light and heat stabilizers, it has been unexpectedly found that the above-specified imidazolidine compounds of the Formula I exhibit an exceptionally high degree of stabilizing action on the synthetic polymers against photo- and thermal-deteriorations thereof and also that they show little thermal sublimation and no appreciable coloring action on the synthetic polymers to be stabilized.

It is, therefore, one object of this invention to provide the syntheic polymers stabilized against photo- and thermal-deteriorations by having incorporated therein an effectively stabilizing amount of the imidazoline compounds of the Formula I.

Representative examples of the imidazolidine compounds (I) which may be employed in this invention are listed hereinbelow. It is, however, to be understood that the present invention is not limited to those illustrated compounds (1) 2,2,5,5-tetramethyl - 4 - oxoimidazolidine (M.P. 169–170° C.);
(2) 2,5-dimethyl - 2,5 - diethyl-4-oxoimidazolidine (M.P. 77–79° C.);
(3) 2,5,5 - trimethyl-2-isobutyl-4-oxoimidazolidine (M.P. 126–128° C.);
(4) 2,5-dimethyl-2,5-diisobutyl-4-oxoimidazolidine;
(5) 1,4-diaza-2,2-dimethyl-3-oxo-spiro[4.5]decane (M.P. 193–194° C.);
(6) cyclohexane-1-spiro-2'-(4'-oxoimidazolidine)-5'-spiro-1''-cyclohexane (M.P. 219–220° C.);
(7) cyclopentane - 1 - spiro-2'-(4'-oxoimidazolidine)-5'-spiro-1''-cyclohexane;
(8) 1,4 - diaza-2-methyl-2-phenyl-3-oxo-spiro[4.5]decane (M.P. 130–131° C.);
(9) 1,4-diazo-2-methyl-2-cyclohexyl-3-oxo-spiro[4.5]decane;
(10) 1,4-diaza - 2 - methyl-2-(3-pyridyl)-3-oxo-spiro[4.5]decane;
(11) 1-methylcyclohexane - 2 - spiro-2'-(4'-oxoimidazolidine)-5'-spiro-2''-(1''-methylcyclohexane) (M.P. 146–148° C.);
(12) 1-cyclohexylcyclohexane-2-spiro-2'-(4'-oxomidazolidine)-5'-spiro-1''-cyclohexane;
(13) 1-cyclohexylidenecyclohexane-2-spiro-2'-(4'-oxoimidazolidine)-5'-spiro-1''-cyclohexane;
(14) 1,3-diaza-2-(3,4-dihydro-2-pyranyl)-4-oxo-spiro[4.5]decane;
(15) 1,3,8 - triaza-2-(p-chlorophenyl)-4-oxo-7,7,9,9-tetramethyl-spiro[4.5]decane (M.P. 215° C.);
(16) 1,3,8 - triaza-2-(2-nitro-5-furyl)-4-oxo-7,7,9,9-tetramethyl-spiro[4.5]decane (M.P. 184–186° C.);
(17) 1,3,8-triaza-2-(2H - 2,6 - dimethyl - 5,6 - dihydro-3-pyranyl)-4-oxo - 7,7,9,9 - tetramethyl-spiro[4.5]decane (M.P. 153–155° C.);
(18) 1,3-diaza-2-(4-pyridyl)-4-oxo-spiro[4.5]decane;
(19) cyclohexane - 1 - spiro-2'-(4'-oxoimidazolidine)-5'-spiro - 4'' - (2'',2'',6'',6'' - tetramethyl-pyperidine-1''-oxyl) (M.P. 202° C.);
(20) 1,3,8-triaza-2-phenyl-4-oxo-7,7,9,9-tetramethyl-spiro[4.5]decane-8-oxyl (M.P. 184–185° C.);
(21) 1,3,8 - triaza-2-(o-tolyl)-4-oxo-7,7,9,9-tetramethyl-spiro[4.5]decane-8-oxyl;
(22) 1,3,8-triaza-2-(p-methoxyphenyl)-4-oxo-7,7,9,9-tetramethyl-spiro[4.5]decane-8-oxyl (M.P. 178–179° C.);
(23) 1,3,8-triaza-2-n-propyl-4-oxo-7,7,9,9-tetramethyl-spiro[4.5]decane-8-oxyl (M.P. 146–147° C.);
(24) 1,3-diaza-2-$\beta$-naphthyl-4-oxo-spiro[4.5]decane;
(25) (2,2,6,6-tetramethylpiperidine)-4-spiro-2'-(4'-oxoimidazolidine)-5'-spiro-1''-cyclohexane;
(26) 1,3,8-triaza-2-n-undecyl-4-oxo-7,7,9,9-tetramethyl-spiro[4.5]decane;
(27) 1,4-diaza-2,2-di-n-heptadecyl-3-oxo-spiro[4.5]decane;
(28) 2,2,5,5-tetramethyl-4-imidazolidinethione (M.P. 153–155° C.);
(29) 2,5-dimethyl-2,5-diisobutyl-4-imidazolidinethione (M.P. 107–108° C.);
(30) cyclohexane-1-spiro-2'-(4'-imidazolidinethione)-5'-spiro-1''-cyclohexane (M.P. 228° C.);
(31) cycloheptane-1-spiro-2'-(4'-imidazolidinethione)-5'-spiro-1''cycloheptane (M.P. 222° C.);
(32) 1-methyl-cyclohexane-4-spiro-2'-(4'-imidazolidine-thione)-5'-spiro-4''-methylcyclohexane (M.P. 228–230° C.);
(33) 1,3-diaza-2,2-dimethyl-4-thioxospiro[4.5]decane (M.P. 215–216° C.);
(34) 1,3-diaza-2-methyl-2-ethyl-4-thioxospiro[4.5]decane (M.P. 144–145° C.); and
(35) 2,2,6,6-tetramethylpiperidine-4-spiro-2'-(4'-imidazolidine)-5'-spiro-4''-(2'',2'',6'',6''-tetramethylpiperidine) (M.P. 231–233° C.).

Where the imidazolidine compounds of the above Formula I are to be employed in the synthetic polymer for the purpose of stabilization, they may be readily incorporated into such polymers by various standard procedures commonly utilized in the art. The stabilizer in this invention may be incorporated into the synthetic polymer at any desired stage prior to the manufacture of shaped articles therefrom. For example, the dry stabilizer in a form of powder may be admixed with the synthetic polymer or a suspension or emulsion of such a polymer may be admixed with a suspension or emulsion of the stabilizer of this invention.

The amount of the imidazolidine compound to be employed in the synthetic polymer in accordance with this invention may be widely varied, depending upon mainly the types, properties and particular use of the polymer to be stabilized.

The usual and preferred concentrations of the stabilizer in this invention may fall within the range of about 0.01–2.0% by weight, and more preferably about 0.05–0.2% by weight, these concentrations being based upon the weight of the synthetic polymer employed.

The imidazolidine compound (I) of this invention may be optionally and advantageously employed for the purpose of stabilization, either alone or in combination with other additives such as known stabilizers (including, for example, antioxidants and ultraviolet absorbants), fillers, pigments and the like. In some cases, an optional combination of two or more imidazolidine compounds (I) may be satisfactorily employed in this invention to obtain the improved results.

Among the imidazolidine compounds having the above Formula I, all the 4-oxoimidazolidine compounds having the above Formula I are novel substances, except for cyclohexane - 1 - spiro - 2' - (4'-oxoimidazolidine)-5'-spiro-1''-cyclohexane which itself is disclosed in the Journal of Organic Chemistry, 28, 3576 (1963). Also, the 4-thioxoimidazolidine compounds and preparation thereof are disclosed in several reports, such as Monatshefte fur Chemie, 98, 338 (1967); Journal of the American Chemical Society, 50, 1422 (1967); and Indian Journal of Chemistry, 5, 290 (1967).

For the purpose of better understanding, the novel 4-oxoimidazolidine compounds may be represented by the following Formula I-a:

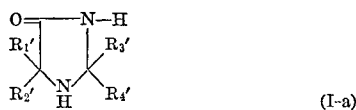

(I-a)

wherein $R_1'$ and $R_2'$ may be the same or different and each represents hydrogen atom,
an alkyl group of 1 to 18 carbon atoms,
a cycloalkyl group of 5 to 7 carbon atoms,
an aryl group of 6 or 10 ring carbon atoms which may be substituted with a halogen atom,
an alkyl group of 1 to 4 carbon atoms or
an alkoxy group of 1 to 8 carbon atoms, or
a 5- or 6-membered heterocyclic group which contains as a hetero atom at least one nitrogen or oxygen atom and may be substituted with nitro, an alkyl group of 1 to 4 carbon atoms or an alkoxy group of 1 to 4 carbon atoms; or
they may be linked together with the carbon atom to which they are attached to form a 5 to 7-membered alicyclic ring which may be substituted with an alkyl group of 1 to 4 carbon atoms, a cycloalkyl group of 5 to 7 carbon atoms or a cycloalkylidene group of 5 to 7 carbon atoms or the group of the formula

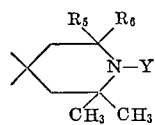

(wherein $R_5$, $R_6$ and Y are as defined above) and $R_3'$ and $R_4'$ may be the same or different and are the same as defined above with regard to the $R_1'$ and $R_2'$; provided that three or more of the $R_1'$, $R_2'$, $R_3'$ and $R_4'$ are the above defined group other than hydrogen atom and, where the $R_1'$ and $R_2'$ form a cyclohexane ring together with the carbon atom to which they are attached, the $R_3'$ and $R_4'$ are the above-defined group other than spiro-cyclohexane.

It is another object of this invention to provide a new class of the imidazolidine compound having the above Formula I-a which is useful as a stabilizer for synthetic polymers.

In another aspect of this invention, it is concerned with an improved process for the preparation of the 4-oxoimidazolidine compound having the formula

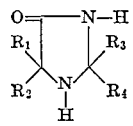

wherein $R_1$, $R_2$, $R_3$, and $R_4$ are as defined above. It has now been (I–b) unexpectedly found that 4-oxoimidazolidine compound having the above Formula I–b can be advantageously prepared by a novel process which comprises (1) Reacting an α-aminonitrile compound having the formula

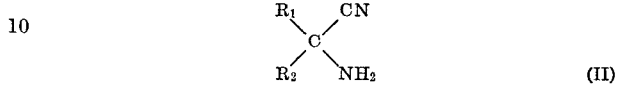

(II)

wherein $R_1$ and $R_2$ are as defined above with a compound having the formula

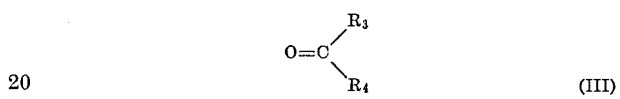

(III)

wherein $R_3$ and $R_4$ are as defined above in the presence of a basic catalyst or (2) Reacting an α-aminonitrile compound having the above Formula II with a compound having the above Formula III to form a compound having the formula

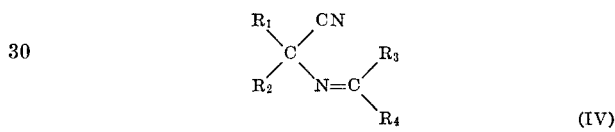

(IV)

wherein $R_1$, $R_2$, $R_3$ and $R_4$ are as defined above and then subjecting the latter product (IV) thus obtained to the action of a basic catalyst.

It is also an object of this invention to provide a novel and advantageous process for the preparation of the 4-oxoimidazolidine compound having the above Formula I–b.

In carrying out the process of this invention, one embodiment (1) as shown above may be preferably conducted by reacting the α-aminonitrile compound (II), dissolved in a suitable inert solvent such as, for example, water, methanol, ethanol and the like, with the aldehyde or ketone (III) in the presence of a basic catalyst. Representative examples of the basic catalysts which may be employed in this invention include alkali metal hydroxides such as sodium hydroxide and potassium hydroxide and alkali metal alkoxides such as sodium methoxide and sodium ethoxide, but there may be employed other basic catalysts that would not adversely affect the reaction in the process of this invention. The amount of the aldehyde or ketone (III) employed may be usually in the range of about 1 to 1.5 mole per mole of the starting α-aminonitrile (II) and the amount of a basic catalyst may usually be a catalytic amount sufficient to catalyze the present reaction. At all events, these amounts may be optionally selected and determined by those skilled in the art. The reaction period and temperature are not critical, but it is usual to conduct the reaction at room temperature for about 2 to 15 hours, in some cases for about several days, and, if necessary, the reaction may be carried out under heating at about 40 to 80° C. in order to accelerate the proceeding of the reaction.

After completion of the reaction, the reaction product may be recovered from the reaction mixture by a conventional method. For example, where the reaction product precipitates in situ, it may be recovered simply by filtration and, where it is dissolved in the reaction mixture, it may be recovered by concentration of the reaction mixture under reduced pressure, if necessary after addition of water, cooling the residue and subsequent distillation. The crude reaction product thus recovered may be purified by a conventional method, for example, by washing with water, drying and recrystallization from a suitable solvent such as water, ethanol, benzene and the like.

Another embodiment (2) as shown above consists of two steps i.e. the first step of reaction of the α-aminonitrile compound (II) with the aldehyde or ketone (III) to form the Schiff base having the above formula (IV) and the second step of subjecting the Schiff base thus obtained to the action of a basic catalyst.

In carrying out this embodiment, the first step may be preferably conducted by heating under reflux for about several hours the α-aminonitrile compound (II) together with the aldehyde or ketone (III) in a suitable inert solvent, for example, those as listed herein above in the embodiment (1), while continuously removing the water formed during the proceeding of the reaction. It is usual and preferable in this step to conduct the reaction either in the absence of a dehydrating catalyst commonly employed in the formation of Schiff base or in the presence of ammonium acetate. After completion of the reaction, the intermediate (IV) may be isolated by a conventional method and utilized for the second step as depicted above. Alternatively, the reaction mixture from the first step per se may be utilized for processing in the second step without isolation of the Schiff base (IV).

The second step may be satisfactorily conducted in the substantially same manner as in the above-shown embodiment (1). The amounts of the reactants and basic catalyst, the reaction period and temperature, the manner for isolation and purification of the product and other requisite in this step may be the same as fully disclosed hereinabove in the embodiment (1).

The following examples are given for the purpose of illustrating excellent stabilizing effects of the imidazolidine compound having the Formula I against deterioration of several synthetic polymers in accordance with this invention and the present improved method for the preparation of the 4-oxoimidazolidine compound having the Formula I-b.

Examples 1-6 describe some preferred embodiments of this invention for stabilization of synthetic polymers and Examples 7-20 describe some preferred embodiments for the preparation of the 4-oxoimidazolidine compounds according to this invention. In these examples, all parts are given by weight unless otherwise stated.

EXAMPLE 1

In a mortar, with 100 parts of polypropylene was intimately admixed 0.25 part of the imidazolidine compound of this invention specified in the following Table I.

The resulting mixture was preheated to 215° C. under a pressure of 10 kg./cm.$^2$ for 2 minutes and then compression-molded into a sheet of 0.5 mm. thick at 215° C. under pressure of 150 kg./cm.$^2$ for 0.5 minute.

As a control for comparative purpose, the polypropylene sheets were prepared by repeating the same procedure as described above except that the commercially available stabilizer shown in the following Table I was employed instead of the stabilizer of this invention. Those sheets containing no stabilizers were also made as described above.

Thereafter, all the sheets thus prepared were tested for the "brittleness time in a fade-meter" (which term means the time, expressed in terms of hour, required until the test sheet will become brittle in the fade-meter defined hereinbelow) under ultraviolet irradiation at 45° C. by means of the fade-meter, "Standard Fade-Meter Type FA-1" manufactured and sold by Toyo Rika Instruments Inc., Japan. Such an instrument is a modification of Atlas Fade-O-Meter Type FDA-R (Atlas Electric Devices Co., U.S.A.) and meets the requirements prescribed in the provisions of "3.8" of Japanese Industrial Standard the item "L-1044" entitled "Testing Method of Colour Fastness to Light of Dyed Textiles and Dyestuffs."

The results are summarized in the following Table I.

TABLE I

| Stabilizer, the imidazolidine compound[1] in this invention: | Brittleness time in a fade-meter (hours) |
|---|---|
| 1 | 120 |
| 5 | 260 |
| 6 | 180 |
| 11 | 280 |
| 15 | 460 |
| 16 | 280 |
| 17 | 260 |
| 19 | 640 |
| 20 | 240 |
| 22 | 260 |
| 23 | 240 |
| 25 | 480 |
| 26 | 500 |
| 27 | 380 |
| 28 | 100 |
| 30 | 120 |
| 34 | 180 |
| 35 | 220 |
| Commercially available stabilizer: | |
| 2-(2'-hydroxy-5'-methylphenyl)-benzotriazole | 80 |
| None | 60 |

[1] The present imidazolidine stabilizer is shown in terms of the number as described hereinabove, for simplicity and convenience.

EXAMPLE 2

The same procedure as in the above Example 1 was repeated except that an equivalent amount of low pressure polyethylene with high density was employed instead of the polypropylene, thereby making up polyethylene sheets, each being of about 0.5 mm. thickness.

These sheets were measured for "brittleness time in a fade-meter" by employing the same procedure and fade-meter as described in the above Example 1. Also, a new set of the sheets was tested for the "brittleness time under air heating" (which term means the time, expressed in terms of day, required until the test sheet will become brittle in the air heating equipment defined hereinbelow) at a temperature of 120° C. by employing the procedure and equipment as prescribed in the provisions "6.3" of Japanese Industrial Standard the item "K-6301" entitled "Physical Testing Methods for Vulcanized Rubber".

These results are summarized in the following Table II.

TABLE II

| | Brittleness time— | |
|---|---|---|
| Stabilizer | In a fade-meter (hours) | Under air heating (days) |
| The imidazolidine* compound in this invention: | | |
| 1 | 800 | 6 |
| 6 | 1,260 | 3 |
| 8 | 1,100 | 3 |
| 9 | 1,100 | 3 |
| 10 | 1,000 | 3 |
| 15 | 1,400 | 5 |
| 20 | 1,600 | 17 |
| 22 | 1,680 | 19 |
| 23 | 1,300 | 9 |
| 32 | 600 | 5 |
| Commercially available stabilizer: | | |
| 2-(2'-hydroxy-5'-methylphenyl)-benzotriazole | 400 | 2 |
| None | 300 | 2 |

*The present imidazolidine stabilizer is shown in terms of the number as described hereinabove, for simplicity and convenience.

EXAMPLE 3

The same procedure as in the above Example 1 was repeated except that an equivalent amount of polystyrene was employed instead of the polypropylene and the amount of the present imidazolidine compounds to be employed was 0.2 g., thereby making up polystyrene sheets, each being of about 0.1 mm. thickness.

These films were exposed to ultraviolet light for 300 hours in the fade-meter described in the above Example 1. Before and after the exposure, infrared spectra of these films were measured by a conventional means. Then, the degrees of increase in absorbancy at 1720 cm.$^{-1}$ were calculated by substracting the absorbancy after exposure from that before exposure.

The results are shown in the following Table III.

TABLE III

| Stabilizer (the imidazolidine compound [1] in this invention): | Degree of increase in absorbency at 1720 cm.$^{-1}$ (percent) |
|---|---|
| 1 | 3.9 |
| 6 | 2.5 |
| 15 | 1.2 |
| 19 | 1.8 |
| 30 | 3.1 |
| Commercially available stabilizer: | |
| 2-(2'-hydroxy-5'-methylphenyl)-benzotriazole | 5 |
| None | 13 |

[1] The present imidazolidine stabilizer is shown in terms of the number as described hereinabove, for simplicity and convenience.

It will be apparent from the above Tables I, II and III that the imidazolidine compound of this invention exhibits prominent stabilizing effects on synthetic polymers, especially polyolefins such as polyethylene, polypropylene, polystyrene and the like against deterioration thereof, as compared with known stabilizers.

EXAMPLE 4

To 100 parts of a commercially available liquid polyester prepared through copolymerization of maleic acid and ethylene glycol with styrene were added 1 part of benzoyl peroxide and 0.1 part of the imidazolidine compound in this invention specified in the following Table IV. The resulting mixture was thermally set to a sheet of about 3 mm. thickness by pre-heating at 70° C. for 30 minutes and then heating to 100° C. for 60 minutes.

The polyester sheet thus prepared was tested for "Yellowing time" (which term means the time, expressed in terms of hour, required until the test sheet will be discolored to yellow) in a conventional weather-proofing tester.

The results are summarized in the following Table IV.

TABLE IV

| The present imidazolidine [1] compound: | Yellowing time (hours) |
|---|---|
| 6 | 200 |
| 15 | 240 |
| None | 60 |

[1] The present imidazolidine stabilizer is shown in terms of the number as described hereinabove, for simplicity and convenience.

It will be apparent from the above Table IV that the imidazolidine compound of this invention exhibits excellent stabilizing effect on synthetic polymers, especially polyester against the deterioration thereof.

EXAMPLE 5

One hundred parts of 6 nylon (polycapramide) was intimately admixed 0.25 part of the imidazolidine compound of this invention specified in the following Table V.

The resulting mixture was preheated to 235° C. under a pressure of 10 kg./cm.$^2$ for 5 minutes and then compression molded into a film of about 0.1 mm. thick, through a conventional molding machine at that temperature under a pressure of 40 kg./cm.$^2$ for 1 minute.

As a control for comparative purpose, the 6 nylon sheet was molded by the same procedure as described just above except that there was not incorporated any kind of stabilizers.

Thereafter, these films were exposed to ultraviolet light for 300 hours in the fade-meter as described in the above Example 1.

The tensile strength retention of the exposed film was measured by means of a conventional tensile testing machine.

The results are shown in the following Table V.

TABLE V

| Stabilizer (the imidazolidine compound [1] in this invention): | Tensile strength retention (percent) |
|---|---|
| 15 | 88 |
| 22 | 96 |
| None | 96 |

[1] The present imidazolidine stabilizer is shown in terms of the number as described hereinabove, for simplicity and convenience.

EXAMPLE 6

To a mixture of 100 parts of polyvinyl chloride, 0.5 part of dibasic lead (IV) stearate, 0.5 part of barium stearate with 0.5 part of cadmium stearate was added 0.2 part of the imidazolidine compound of this invention specified in the following Table VI. The resulting mixture was milled for 4 minutes by passing through milling rolls at 180° C. to form a sheet of about 0.5 mm. thickness.

The polyvinyl chloride sheet thus prepared was tested for "Brown-spot time" (which term means the time, expressed in terms of hour, required until brown-colored spots will appear in the surface of the test sheet) in a conventional weather-proofing tester.

The results are shown in the following Table VI.

TABLE VI

| Stabilizer (the imidazolidine compound [1] in this invention) | Brown-spot time (hours) |
|---|---|
| 6 | 1300 |
| 23 | 1500 |
| None | 500 |

[1] The present imidazolidine stabilizer is shown in terms of the number as described hereinabove, for simplicity and convenience.

It will be apparent from the above result that the imidazolidine compound of this invention exhibits prominent stabilizing effect on synthetic polymers, especially polymerized vinyl monomer such as polyvinyl chloride and the like.

EXAMPLE 7

Cyclohexane-1-spiro-2'-(4'-oxoimidazolidine)-5'-spiro-1''-cyclohexane

To a solution of 12.4 g. of 1 - amino-1-cyanocyclohexane and 9.8 g. of cyclohexanone in 50 ml. of methanol was added dropwise at room temperature 1 ml. of a 40% aqueous sodium hydroxide solution with stirring. The resulting mixture was then stirred at that temperature for 8 hours. The crystalline substance which precipitated in situ was recovered by filtration and recrystallized from ethanol to give 21.0 g. of the desired product as white crystals melting at 219° C. Yield, 93.8%.

*Analysis.*—Calculated for $C_{13}H_{22}ON_2$ (percent): C, 70.23; H, 9.97; N, 12.60. Found (percent): C, 70.26; H, 9.88; N, 12.57.

The product thus obtained was identified with an authentic sample by means of a mixed melting point and infrared absorption spectra.

Following the same procedure as set forth above except that cyclopentanone was substituted for the cyclohexanone, there was obtained cyclopentane-1-spiro-2'-(4'-oxoimidazolidine)-5'-spiro-1''-cyclohexane.

Similarly, from 3-acetylpyridine there was obtained 1,3-diaza - 2 - methyl - 2 - (3 - pyridyl) - 4 - oxo - spiro[4.5]-decane.

EXAMPLE 8

1-methylcyclohexane-2-spiro-2'-(4'-oxoimidazolidine-5'-spiro-2''-(1''-methylcyclohexane)

To a solution of 2 g. of sodium hydroxide in 50 ml. of ethanol was added with stirring at room temperature 13.8 g. of 1-cyano-2-methyl-cyclohexylamine and 11.2 g. of 2-methyl-cyclohexanone. The resulting mixture was then stirred at that temperature for 4 days. At the end of this period, the reaction mixture was concentrated under reduced pressure and, upon cooling, the residue crystallized. After filtration, the crystalline substance was washed with water, dried and then recrystallized from petroleum benzin to give the desired product as white crystals melting at 146–148° C.

*Analysis.*—Calculated for $C_{15}H_{26}ON_2$ (percent): C, 71.95; H, 10.47; N, 11.19. Found (percent): C, 72.02; H, 10.49; N, 11.22.

EXAMPLE 9

1,4-diaza-2,2-dimethyl-3-oxo-spiro[4.5]decane

To a solution of 8.4 g. of α-aminoisobutyronitrile and 9.8 g. of cyclohexanone in 40 ml. of methanol was added dropwise at room temperature 1 ml. of a 5% methanolic solution of sodium methylate. The resulting mixture was stirred at room temperature for 5 hours and then at 40–50° C. for further 6 hours. At the end of this period, the reaction mixture was cooled to separate a crystalline substance, which was then recovered by filtration. The crystalline substance thus obtained was washed successively with methanol and water, dried and then recrystallized from ethanol to give the desired product as white crystals melting at 193–194° C.

*Analysis.*—Calculated for $C_{10}H_{18}ON_2$ (percent): C, 65.89; H, 9.96; N, 15.37. Found (percent): C, 65.77; H, 9.84; N, 15.24.

Following the same procedure as set forth above except that α-phenylacetonitrile was substituted for the α-aminoisobutyronitrile, there was obtained 1,4-diaza-2-phenyl-3-oxo-spiro[4.5]decane.

EXAMPLE 10

2,2,5,5-tetramethyl-4-oxoimidazolidine

To a solution of 0.5 g. of sodium hydroxide in 40 ml. of ethanol was added with stirring at room temperature 8.4 g. of α - aminoisobutyronitrile and then 6.4 g. of acetone. The resulting mixture was stirred at room temperature for 3 days. At the end of this period, the reaction mixture was concentrated under reduced pressure to give an oily substance which crystallized upon cooling in a small amount of water. The crystalline substance thus formed was recovered by filtration, washed with cold water, dried and then recrystallized from water to give the desired product as white crystals melting at 169–170° C.

*Analysis.*—Calculated for $C_7H_{14}ON_2$ (percent): C, 59.12; H, 9.92; N, 19.70; Found (percent): C, 58.96; H, 10.11; N, 19.66.

EXAMPLE 11

2,5-dimethyl-2,5-diethyl-4-oxoimidazolidine

Following the same procedure as set forth in the above Example 7 except that there were employed 9.8 g. of 2-amino-2-cyanobutane and 7.2 g. of methyl ethyl ketone, the reaction was conducted. After completion of the reaction, the reaction mixture was concentrated and the residue was extracted several times with benzene. The combined benzene extracts were washed with water, dried over anhydrous potassium carbonate and then the solvent was distilled off to give an oily residue, which crystallized upon cooling. The crystalline substance thus formed was recovered by filtration and recrystallized from petroleum benzin—benzene (1:1) to give the desired product as white crystals melting at 77–79° C.

*Analysis.*—Calculated for $C_9H_{18}ON_2$ (percent): C, 63.49; H, 10.66; N, 16.46. Found (percent): C, 63.43; H, 10.62; N, 16.39.

EXAMPLE 12

2,5,5-trimethyl-2-isobutyl-4-oxoimidazolidine

Following the same procedure as set forth in the above Example 11 except that there were employed 8.4 g. of α-aminoisobutyronitrile and 10.0 g. of methyl isobutyl ketone and the crude reaction product was recrystallized from benzene, there was obtained the desired product melting at 126–128° C.

*Analysis.*—Calculated for $C_{10}H_{20}ON_2$ (percent): C, 65.17; H, 10.94; N, 15.20. Found (percent): C, 65.04; H, 10.88; N, 15.06.

EXAMPLE 13

Cyclohexane-1-spiro-2'-(4'-oxoimidazolidine)-5'-spiro-4''-(2'',2'',6'',6''-tetramethylpiperidine-1''-oxide)

To a solution of 2 g. of sodium hydroxide in 50 ml. of ethanol were added with stirring at room temperature 19.6 g. of 4-amino-4-cyano-2,2,6,6-tetramethylpiperidine-1-oxide and 9.8 g. of cyclohexanone. The resulting mixture was stirred at that temperature for 4 days. The reaction mixture was concentrated under reduced pressure and, upon cooling, the residue crystallized. The crystalline substance so obtained was recovered by filtration, washed with water, dried and then recrystallized from ethanol to give the desired product as pale brown crystals melting at 201–202° C.

*Analysis.*—Calculated for $C_{16}H_{28}O_2N_3$ (percent): C, 65.27; H, 9.59; N, 14.27. Found (percent): C, 65.22; H, 9.57; N, 14.26.

EXAMPLE 14

1,3,8-triaza-2-n-propyl-4-oxo-7,7,9,9-tetramethyl-spiro[4.5]decane-8-oxide

Following the same procedure as set forth in the above Example 10 except that there were employed 19.6 g. of 4-amino-4-cyano-2,2,6,6-tetramethyl piperidine - 1 - oxide and 7.2 g. of n-butylaldehyde and the crude reaction product was recrystallized from benzene, there was obtained the desired product as pale yellow crystals melting at 146–147° C.

*Analysis.*—Calculated for $C_{14}H_{26}O_2N_3$ (percent): C, 62.65; H, 9.77; N, 15.66. Found (percent): C, 62.49; H, 9.73; N, 15.48.

EXAMPLE 15

1,3,8-triaza-2-phenyl-4-oxo-7,7,9,9-tetramethyl-spiro[4.5]decane-8-oxide

Following the same procedure as set forth in the above Example 13 except that there were employed 19.6 g. of 4-amino-4-cyano - 2,2,6,6 - tetramethylpiperidine-1-oxide and 10.6 g. of benzaldehyde and the crude reaction product was recrystallized from methanol, there was obtained the desired product as pale pink crystals melting at 184–185° C.

*Analysis.*—Calculated for $C_{17}H_{24}O_2N_3$ (percent): C, 67.52; H, 8.00; N, 13.90. Found (percent): C, 67.46; H, 7.92; N, 13.81.

EXAMPLE 16

1,3,8-triaza-2-p-chlorophenyl-4-oxo-7,7,9,9-tetramethyl-spiro[4.5]decane

Following the same procedure as set forth in the above Example 7 except that there were employed 18.1 g. of 4-amino-4-cyano-2,2,6,6-tetramethylpiperidine and 14.0 g. of p-chlorobenzaldehyde and the crude reaction product was recrystallized from ethanol, there was obtained the desired product as white crystals melting at 215° C.

*Analysis.*—Calculated for $C_{17}H_{24}ON_3Cl$ (percent): C, 63.15; H, 7.53; N, 13.28. Found (percent): C, 63.26; H, 7.56; N, 13.20.

EXAMPLE 17

1,3,8-triaza-2-p-methoxyphenyl-4-oxo-7,7,9,9-tetramethyl-spiro[4.5]decane-8-oxide Following the same procedure as set forth in the above Example 13 except that there were employed 19.6 g. of 4-amino-cyano-2,2,6,6-tetramethylpiperidine-1-oxide and 13.6 g. of p-methoxybenzaldehyde and the crude reaction product was recrystallized from benzene, there was obtained the desired product melting at 178–179° C.

*Analysis.*—Calculated for $C_{18}H_{26}O_3N_3$ (percent): C, 65.03; H, 7.88; N, 12.64. Found (percent): C, 64.90; H, 7.81; N, 12.59.

In the same manner as set forth above, there was obtained 1,3,8 - triaza-2-o-tolyl-4-oxo-7,7,9,9-tetramethyl-spiro[4.5]decane-8-oxide from 4-amino-4-cyano-2,2,6,6-tetramethylpiperidine-1-oxide and o-methylbenzaldehyde.

EXAMPLE 18

1,3,8-triaza-2-(2-nitro-5-furyl)-4-oxo-7,7,9,9-tetramethyl-spiro[4.5]decane

Following the same procedure as set forth in the above Example 8 except that there were employed 1.8 g. of 4-amino-4-cyano-2,2,6,6-tetramethylpiperidine and 1.4 g. of 5-nitro-2-furfural, the reaction was conducted. The reaction mixture so obtained was concentrated under reduced pressure and the residue was dissolved in benzene. The benzene solution was washed with water, dried and then the solvent was removed by distillation. The crystalline residue so obtained was recrystallized from a mixture of benzene and petroleum benzin to give the desired product as pale brown crystals melting at 184–186° C.

*Analysis.*—Calculated for $C_{15}H_{22}O_4N_4$ (percent): C, 55.88; H, 6.88; N, 17.38. Found (percent): C, 55.74; H, 6.82; N, 17.33.

EXAMPLE 19

1,3,8-triaza-2-(2H-2,6-dimethyl-5,6-dihydro-3-pyranyl)-4-oxo-7,7,9,9-tetramethyl-spiro[4.5]decane Following the same procedure as set forth in the above Example 18 except that there were employed 1.8 g. of 4-amino-4-cyano-2,2,6,6-tetramethylpiperidine and 1.4 g. of 2H-2,6-dimethyl-5,6-dihydropyrane and the crude reaction product was recrystallized from dilute ethanol to give the desired product melting at 153–155° C.

*Analysis.*—Calculated for $C_{18}H_{31}O_2N_3$ (percent): C, 67.25; H, 9.72; N, 13.07. Found (percent): C, 67.11; H, 9.74; N, 12.96.

EXAMPLE 20

1,3,8-triaza-2-phenyl-4-oxo-7,7,9,9-tetramethyl-spiro[4.5]decane-8-oxide

To a solution of 2 g. of 4-amino-4-cyano-2,2,6,6-tetramethylpiperidine-1-oxide and 1.1 g. of benzaldehyde in 50 ml. of benzene was added 0.2 g. of ammonium acetate. The resulting mixture was heated under reflux for 7 hours, while continuously removing the water formed during the proceeding of the reaction. At the end of this time, the reaction mixture was washed with water, dried and then the benzene was distilled off. The crystalline residue so obtained was recrystallized from benzene to give 4-benzylideneamino - 4 - cyano-2,2,6,6-tetramethylpiperidine-1-oxide as pale red crystals melting at 84–85° C.

*Analysis.*—Calculated for $C_{17}H_{22}ON_3$ (percent): C, 71.80; H, 7.80; N, 14.78. Found (percent): C, 71.79; H, 7.89; N, 14.65.

Infrared absorption spectrum (Nujol):

$\nu$—$CN$ 2220 cm.$^{-1}$, $\nu$—$C=N$—1646 cm.$^{-1}$

To a solution of 0.3 g. of sodium hydroxide in 40 ml. of 95% ethanol was added 2.8 g. of the Schiff base obtained as described above. The resulting mixture was stirred at room temperature for 5 days. The reaction mixture was concentrated under reduced pressure and the residue thus obtained was dissolved in 100 ml. of benzene. The benzene solution was washed with water, dried and then the benzene was distilled off. The crystalline residue was recrystallized from methanol to give the desired product as pale pink crystals melting at 184–185° C. The product was identified with that of the above Example 15 by means of a mixed melting point and infrared absorption spectra.

What is claimed is:

1. A synthetic polymer stabilized against deterioration by light and heat, said synthetic polymer consisting of (1) mono-alpha-olefin homopolymers and copolymers, (2) polystyrene, (3) polycarbonamides having recurring amide groups as intergral parts of the main polymer chain, (4) cross-linked polymers of unsaturated polyesters or (5) polymers of chlorine-containing vinyl monomers, wherein there is incorporated, in a sufficient amount to prevent said deterioration, a compound having the formula

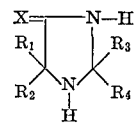

wherein $R_1$ and $R_2$ may be the same or different and each represents hydrogen atom, an alkyl group of 1 to 18 carbon atoms, a cycloalkyl group of 5 to 7 carbon atoms, an aryl group of 6 or 10 ring carbon atoms which may be substituted with a halogen atom, an alkyl group of 1 to 4 carbon atoms or an alkoxy group of 1 to 8 carbon atoms, or a 5- or 6-membered heterocyclic group which contains as a hetero atom at least one nitrogen or oxygen atom and may be substituted with nitro, an alkyl group of 1 to 4 carbon atoms or an alkoxy group of 1 to 4 carbon atoms; or they may be linked together with the carbon atom to which they are attached to form a 5- to 7-membered alicyclic ring which may be substituted with an alkyl group of 1 to 4 carbon atoms, a cycloalkyl group of 5 to 7 carbon atoms or a cycloalkylidene group of 5 to 7 carbon atoms or the group of the formula

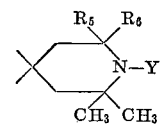

wherein $R_5$ and $R_6$ may be the same or different and each represents an alkyl group of 1 to 6 carbon atoms and Y is hydrogen or oxygen; and $R_3$ and $R_4$ may be the same or different and are the same as defined above with regard to the $R_1$ and $R_2$; provided that three or more of the $R_1$, $R_2$, $R_3$ and $R_4$ are the above-defined groups other than hydrogen atom; and X is oxygen.

2. The synthetic polymer according to claim 1 wherein said amount is in the range of from 0.01 to 2% by weight based upon the weight of synthetic polymer.

3. The synthetic polymer according to claim 1, wherein said polymer is polyethylene, polypropylene, polystyrene, polycapramide, polylhexamethylene adipamide or polyvinyl chloride.

4. The synthetic polymer according to claim 1, wherein said compound is selected from the group consisting of 2,2,5,5-tetramethyl-4-oxoimidazolidine,
cyclohexane-1-spiro-2'-(4'-oxoimidazolidine)-5'-spiro-1''-cyclohexane,
1,4-diaza-2-methyl-2-phenyl-3-oxospiro[4.5] decane,
1-methylcyclohexane-2-spiro-2'-(4'-oxoimidazolidine)-5'-spiro-2''-(1''-methylcyclohexane), 1,3,8-triaza-2-(p-chlorophenyl)-4-oxo-7,7,9,9-tetramethyl-spiro [4.5] decane,
1,3,8-triaza-2-(p-methoxyphenyl)-4-oxo-7,7,9,9,-tetramethyl-spiro [4.5] decane-8-oxyl,
(2,2,6,6-tetramethylpiperidine)-4-spiro-2'-(4'-oxoimidazolidine)-5'-spiro-1''-cyclohexane,
1,3,8-triaza-2-n-undecyl-4-oxo-7,7,9,9-tetramethyl-spiro [4.5] decane, and
1,4-diaza-2,2-di-n-heptadecyl-3-oxo-spiro [4.5] decane.

References Cited
UNITED STATES PATENTS

| | | | |
|---|---|---|---|
| 3,205,195 | 9/1965 | Cook | 260—45.8 |
| 3,347,677 | 10/1967 | Jaworski et al. | 99—2 |
| 3,448,074 | 6/1969 | Kitaoka et al. | 260—45.8 |

DONALD E. CZAJA, Primary Examiner

R. A. WHITE, Assistant Examiner